Figure 5:
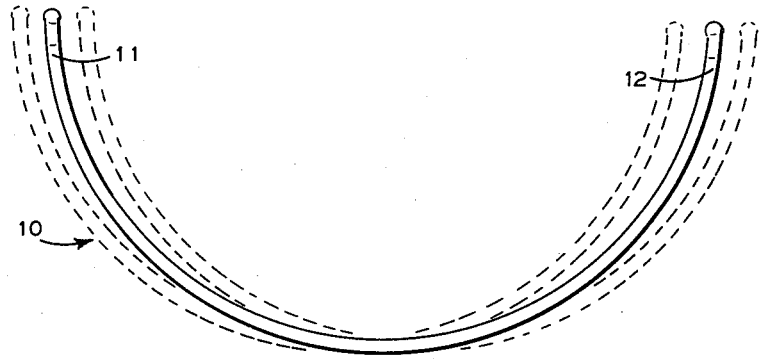

Dec. 11, 1962    M. SCHWARTZ    3,067,750
GARMENT SUPPORTING ELEMENTS
Filed Nov. 3, 1961    2 Sheets-Sheet 1
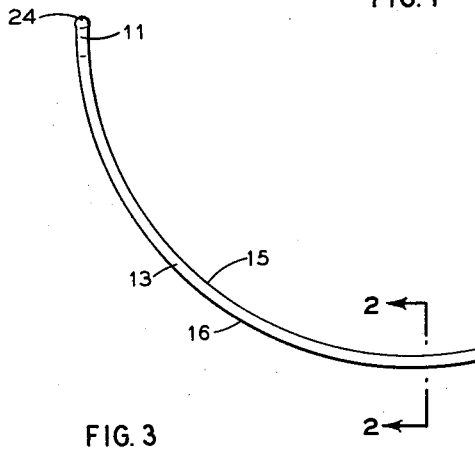
INVENTOR.
Marcus Schwartz
BY
*Irving Seidman*
ATTORNEY Dec. 11, 1962        M. SCHWARTZ        3,067,750
GARMENT SUPPORTING ELEMENTS
Filed Nov. 3, 1961                    2 Sheets-Sheet 2

INVENTOR.
Marcus Schwartz
BY
ATTORNEY

United States Patent Office 3,067,750
Patented Dec. 11, 1962

3,067,750
GARMENT SUPPORTING ELEMENTS
Marcus Schwartz, Kew Garden Hills, N.Y., assignor to
S. & S. Industries, Inc., New York, N.Y., a corporation
Filed Nov. 3, 1961, Ser. No. 150,090
5 Claims. (Cl. 128—476)

This invention relates to garment supporting elements, and more particularly concerns elements useful as supports for the pocket portions of brassieres and the like.

A brassiere or garment supporting member should support the bust with a minimum of pressure against the body of the wearer. Preferably, it should be compliant with respect to the body of the wearer as to be able to conform in accordance with the variations of each individual's body. It has been proposed to use U shaped supporting elements made of steel wire having a rectangular section which have a resilience and springiness when the opposite end portions of the wire are displaced in directions toward and away from each other as well as in directions normal to the plane of the wire.

As can readily be seen, steel wire as a supporting member in a lady's dainty undergarment such as a brassiere, is somewhat incompatible with such a garment. The steel wire products used as supporting members in a brassiere, cannot exhibit all the necessary characteristics required of a garment supporting element and to a certain extent lack comfort insofar as a particular wearer is concerned. Thus, such known wire support members, while providing effective support means, they do not conform to the body contours of a particular wearer of a brassiere incorporating the same.

While attempts have been made to make similar support elements from plastic materials, rather than metal wire, the resultant products have not exhibited all the necessary and requisite characteristics of a garment support element.

Accordingly, an object of this invention is to provide an improved garment support element formed of resin impregnated glass fiber, wherein such element exhibits unique properties making the same particularly effective as a brassiere wire or the like.

Another object of this invention is to provide an improved method of forming plastic brassiere elements which have the desirable properties of metal wires used for the same purpose, and in addition display properties not found in such metal wires.

A further object of this invention is to provide a supporting element for a brassiere or the like, which has a resiliency and springiness to properly support the bust, yet also shows a softness and compliancy which permits the element to conform to the body contours of the wearer, thereby assuring maximum comfort.

Other objects of this invention will in part be obvious and in part hereinafter pointed out.

Figure 6:
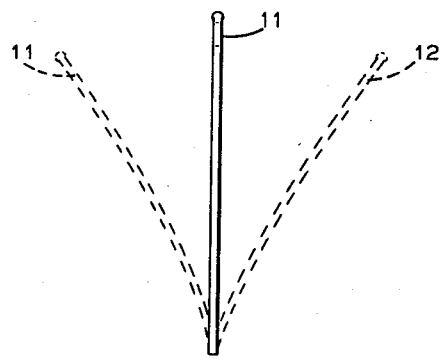
Figure 7:
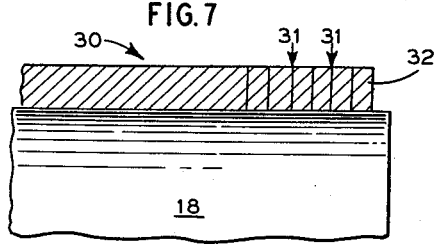

In the drawing, FIG. 1 is a plan view of a support element for a garment construction, embodying the invention; FIG. 2 is an enlarged transverse section taken on the line 2—2 of FIG. 1; FIG. 3 is an enlarged longitudinal section showing a step in the procedure of making such element; FIG. 4 is a plan view of a ring shaped member as it is removed from the forming mandrel; FIG. 5 is a view similar to that of FIG. 1, showing the end portions displaced towards and away from each other; FIG. 6 is an end view of the element shown in FIG. 1, with the ends displaced from the plane thereof; and FIG. 7 is an enlarged longitudinal sectional view showing an alternative procedure for making the support elements.

As shown in FIG. 1, 10 designates a support element embodying the invention. The same is semicircular or U shaped with a transverse section of rectangular shape. The opposite ends 11, 12 of element 10 normally lie in a common plane, with the sides 13, 14 of any section thereof, extending radially relative to said common plane; and the ends 15, 16 of such section, extending normal to such plane.

The sides 13, 14 of the element section are of greater dimension and have a ratio of about 4:1 as compared to the sides 15, 16. Thus, by way of example, sides 13, 14 may be about .140" while sides 15, 16 may be about .035".

The elements 10 are formed of glass fiber yarns initially impregnated with epoxy condensate resins in a B or incompletely cured stage. The yarns are in the form of rovings made up of 12 ends. The ends are untwisted and are slightly sized at their formation to hold the same together in yarn form. The yarns, indicated at 17 in FIG. 3, are impregnated with the epoxy resin in the usual manner, with the impregnated product having a resin content of from about 15 to 25% by weight; and preferably about 20% by weight.

The impregnated yarns 17 are fed to a rotating mandrel 18 which carries axially spaced collars 19; the spacing being equal to the dimension of sides 15, 16 of the finished element 10. The mandrel 18 is suitably heated, by means, not shown, to a temperature of about 320° F. The yarns 17 are wound on said mandrel between adjacent collars 19 to a depth corresponding to the dimensions of sides 13, 14 of finished element 10.

The impregnated yarns 17 are wound under a tension of the order of 5 to 7#. The impregnated yarns are held on the heated mandrel for a time sufficient to allow the resin impregnant to diffuse through the windings. The mandrel and wound yarns are then allowed to cool to room temperature.

The wound members 20 disposed between successive collars 19, wherein the fibers are in closely compacted relation with the resin impregnant substantially uniformly distributed therethrough, are then slipped off mandrel 18, as by successively removing the collars 19 which are held in place on said mandrel by set screws, not shown.

The resultant ring shaped members 20 are heated in an oven, not shown, held at a curing temperature of about 400° F., where the members 20 are retained for a time interval sufficient to effect a complete cure of the epoxy resin impregnant thereof. The members 20 are split diametrically as at 21, to provide from each a pair of elements 10.

When an element 10 has its end portions 11, 12 moved toward or away from each other in a common plane, as indicated by the dotted lines in FIG. 5, the end portions exhibit substantial resilience and springiness in relation to each other and tend to resume their normal positions. This provides the springiness and resilience which allows the element 10 to properly function as a brassiere wire.

However, when end portions 11, 12 are displaced in directions normal to the plane of the element 10, as indicated by dotted lines in FIG. 6, the thus displaced end portions tend to stay in such displaced positions, yet may be readily displaced again to restore the end portions to their normal planar condition. Furthermore, despite such displacement of end portions 11, 12, the springiness and resilience exhibited upon displacement in directions toward and away from each other in a common plane, is retained.

Thus the element 10 exhibits a softness and compliancy which makes the same readily conform to the body contours of the wearer of a brassiere containing such element.

The elements 10 also exhibit substantial toughness and will not fracture despite sharp bending of the end portions 11, 12 toward each other to form a small angle therebetween.

The freshly cut edges 22, 23 at end portions 11, 12 resulting from the split of ring shaped members 20, are coated with curable resin as at 24, which upon completion of the cure of elements 10, will also cure to provide finished ends.

The elements 10 may also be formed by an alternative procedure, wherein the resin impregnated yarns 17 are wound on a heated mandrel 18 and with a small winding pitch, without the use of collars 19, to form a tubular member 30. The resin is diffused through the yarns, as previously described.

The tubular member 30 while still on mandrel 18, is then placed in an oven to be heated at a temperature of about 400° F. for a time interval sufficient to complete the cure of the epoxy resin impregnant.

The tubular member 30 is then slit at spaced intervals 31 measured by a distance equal to the thickness of the elements 10 and the rings 32 are removed from the mandrel. Rings 32 are then split diametrically, as previously described to provide the individual elements 10, which can be finished, as previously described.

As various changes might be made in the embodiments of the invention as herein disclosed without departing from the spirit thereof, it is understood that all matter herein shown or described shall be deemed illustrative and not limiting except as set forth in the appended claims.

What is claimed is:

1. A supporting element for garment constructions comprising a U shaped member of substantially rectangular cross section with opposite end portions normally disposed in a common plane, said member comprising glass fiber yarns under tension retained in their tensioned condition by cured synthetic resin impregnant, said impregnated yarns being disposed in closely abutting, curved array corresponding to the curvature of said member, the opposite end portions of said member having relative resilience and springiness upon displacement of said end portions in directions towards and away from each other substantially in said common plane; the opposite end portions of said member being further displaceable in directions substantially normal to said common plane and tending to retain their displaced positions.

2. A supporting element as in claim 1 wherein said synthetic resin is an epoxy resin.

3. A supporting element as in claim 2 wherein said member comprises from about 15 to 25% resin and from 85 to 75% glass fiber yarns, all by weight.

4. A U shaped supporting element of rectangular section with the opposite end portions thereof disposed in a common plane, the sides of greater dimension of said section lying parallel to said common plane, said element being formed of arcuate epoxy resin impregnated glass fiber yarns, with the arcuate yarns disposed substantially parallel to the sides of said element, the opposite end portions of said element being resilient and springy upon relative displacement thereof in the common plane of said element, said end portions being compliantly displaceable in directions normal to said common plane and tending to retain such displaced positions thereof.

5. A supporting element of semicircular, U shape and of rectangular cross section with the dimensions of the side portions extending in a radial direction and the side portions extending in an axial direction having a ratio of about 4:1; said element being formed of resin impregnated yarns under tension disposed in substantially parallel relation, the opposite end portions of said element being resilient and springy upon relative displacement thereof in directions toward and away from each other, the opposite end portions being displaceable in directions normal to the plane of said element, said displaced portions tending to remain in their displaced positions while retaining resilience and springiness upon displacement in directions toward and away from each other.

References Cited in the file of this patent

UNITED STATES PATENTS

| | | |
|---|---|---|
| 2,506,026 | Kifer et al. | May 2, 1950 |
| 2,531,843 | Durey et al. | Nov. 28, 1950 |
| 2,601,269 | Fisch | June 24, 1952 |
| 2,705,800 | Schwartz | Apr. 12, 1955 |
| 2,782,417 | Magidson | Feb. 26, 1957 |
| 2,900,982 | Lopez-Henriquez | Aug. 25, 1959 |
| 2,956,039 | Novak et al. | Oct. 11, 1960 |
| 2,973,763 | Rowell | Mar. 7, 1961 |
| 2,979,433 | MacHenry | Apr. 11, 1961 |